US011379967B2

(12) United States Patent
George et al.

(10) Patent No.: US 11,379,967 B2
(45) Date of Patent: Jul. 5, 2022

(54) METHODS AND SYSTEMS FOR INSPECTION OF SEMICONDUCTOR STRUCTURES WITH AUTOMATICALLY GENERATED DEFECT FEATURES

(71) Applicant: KLA Corporation, Milpitas, CA (US)

(72) Inventors: Jacob George, Cochin (IN); Saravanan Paramasivam, Chennai (IN); Martin Plihal, Pleasanton, CA (US); Niveditha Lakshmi Narasimhan, Chennai (IN); Sairam Ravu, Chennai (IN); Prasanti Uppaluri, Saratoga, CA (US)

(73) Assignee: KLA Corporation, Milpitas, CA (US)

( * ) Notice: Subject to any disclaimer, the term of this patent is extended or adjusted under 35 U.S.C. 154(b) by 1 day.

(21) Appl. No.: 16/744,385

(22) Filed: Jan. 16, 2020

(65) Prior Publication Data

US 2020/0234428 A1  Jul. 23, 2020

Related U.S. Application Data

(60) Provisional application No. 62/896,578, filed on Sep. 6, 2019.

(51) Int. Cl.
*G06T 7/00* (2017.01)
*G06N 3/08* (2006.01)
*G06K 9/62* (2022.01)

(52) U.S. Cl.
CPC .......... *G06T 7/0004* (2013.01); *G06K 9/6257* (2013.01); *G06K 9/6267* (2013.01);
(Continued)

(58) Field of Classification Search
CPC ................... G06T 7/0004; G06T 7/001; G06T 2207/20081; G06T 2207/20084;
(Continued)

(56) References Cited

U.S. PATENT DOCUMENTS 5,608,526 A  3/1997 Piwonka-Corle et al.
5,859,424 A  1/1999 Norton et al.
(Continued)

FOREIGN PATENT DOCUMENTS

KR  1020180117532  10/2018
WO  2018165753 A1  9/2018

OTHER PUBLICATIONS

S. Faghih-Roohi, S. Hajizadeh, A. Núñez, R. Babuska and B. De Schutter, "Deep convolutional neural networks for detection of rail surface defects," 2016 International Joint Conference on Neural Networks (IJCNN), 2016, pp. 2584-2589, doi: 10.1109/IJCNN.2016. 7727522. (Year: 2016).*

(Continued)

*Primary Examiner* — Andrew M Moyer
*Assistant Examiner* — Stephen M Brinich
(74) *Attorney, Agent, or Firm* — Spano Law Group; Joseph S. Spano

(57) ABSTRACT

Methods and systems for improved detection and classification of defects of interest (DOI) is realized based on values of one or more automatically generated attributes derived from images of a candidate defect. Automatically generated attributes are determined by iteratively training, reducing, and retraining a deep learning model. The deep learning model relates optical images of candidate defects to a known classification of those defects. After model reduction, attributes of the reduced model are identified which strongly relate the optical images of candidate defects to the known classification of the defects. The reduced model is subsequently employed to generate values of the identified attributes associated with images of candidate defects having unknown classification. In another aspect, a statistical classifier is employed to classify defects based on automatically generated attributes and attributes identified manually.

20 Claims, 10 Drawing Sheets

(52) U.S. Cl.
CPC ...... *G06N 3/08* (2013.01); *G06T 2207/20081* (2013.01); *G06T 2207/20084* (2013.01); *G06T 2207/20224* (2013.01); *G06T 2207/30148* (2013.01)

(58) Field of Classification Search
CPC . G06T 2207/20224; G06T 2207/30148; G06T 2207/30152; G06T 2207/30141; G06K 9/6257; G06K 9/6256; G06K 9/6255; G06K 9/6267
USPC ................................. 382/149–150, 155–160
See application file for complete search history.

(56) References Cited

U.S. PATENT DOCUMENTS

| | | | |
|---|---|---|---|
| 6,201,601 B1 | 3/2001 | Vaez-Iravani et al. | |
| 6,208,411 B1 | 3/2001 | Vaez-Iravani | |
| 6,271,916 B1 | 8/2001 | Marxer et al. | |
| 6,429,943 B1 | 8/2002 | Opsal et al. | |
| 7,130,039 B2 | 10/2006 | Vaez-Iravani et al. | |
| 7,295,303 B1 | 11/2007 | Vaez-Iravani et al. | |
| 7,478,019 B2 | 1/2009 | Zangooie et al. | |
| 7,777,876 B2 | 8/2010 | Horai et al. | |
| 7,933,026 B2 | 4/2011 | Opsal et al. | |
| 8,912,495 B2 | 12/2014 | Lange | |
| 9,007,581 B2 | 4/2015 | Horai et al. | |
| 9,075,027 B2 | 7/2015 | Lange | |
| 2014/0111791 A1 | 4/2014 | Manassen et al. | |
| 2014/0172394 A1 | 6/2014 | Kuznetsov et al. | |
| 2014/0222380 A1 | 8/2014 | Kuznetsov et al. | |
| 2014/0268117 A1 | 9/2014 | Kolchin et al. | |
| 2014/0300890 A1 | 10/2014 | Lange et al. | |
| 2016/0163035 A1 | 6/2016 | Chang et al. | |
| 2016/0209334 A1 | 7/2016 | Chen et al. | |
| 2016/0259994 A1* | 9/2016 | Ravindran | G06N 3/08 |
| 2018/0060702 A1 | 3/2018 | Ma et al. | |
| 2018/0075594 A1 | 3/2018 | Brauer | |
| 2018/0182039 A1* | 6/2018 | Wang | G06K 9/6268 |
| 2018/0268257 A1* | 9/2018 | Ren | G06T 7/001 |
| 2018/0268533 A1* | 9/2018 | Meeh | G06T 7/0002 |
| 2019/0073568 A1* | 3/2019 | He | G06K 9/6267 |
| 2019/0287237 A1* | 9/2019 | de Bonfim Gripp | G06T 7/136 |

OTHER PUBLICATIONS

International Search Report dated Jun. 4, 2020, for PCT Application No. PCT/US2020/013969, filed on Jan. 17, 2020 by KLA Corporation, 3 pages.

* cited by examiner

| ATTRIBUTES (RANKED) | ATTRIBUTE IMPORTANCE |
|---|---|
| F10 | 113.2475 |
| F20 | 71.0493 |
| F1 | 68.9378 |
| F9 | 68.5798 |
| F17 | 66.7849 |
| F2 | 63.8907 |
| F4 | 51.0111 |
| F6 | 36.0520 |
| F24 | 33.5254 |
| F19 | 31.3825 |
| SPOT LIKENESS | 30.6798 |
| F3 | 29.0934 |
| PATCH DEFECT SIGNAL | 27.0101 |
| F16 | 23.2970 |
| F11 | 21.5118 |
| F14 | 21.2284 |
| F12 | 20.6235 |
| F31 | 19.5324 |

FIG. 9

METHODS AND SYSTEMS FOR INSPECTION OF SEMICONDUCTOR STRUCTURES WITH AUTOMATICALLY GENERATED DEFECT FEATURES

CROSS REFERENCE TO RELATED APPLICATION

The present application for patent claims priority under 35 U.S.C. § 119 from Patent Application No. 201941002244 at the Government of India Patent Office, filed Jan. 18, 2019, and claims priority under 35 U.S.C. § 119 from U.S. provisional patent application Ser. No. 62/896,578, filed Sep. 6, 2019. The subject matter of each prior filed application is incorporated herein by reference in its entirety.

TECHNICAL FIELD

The described embodiments relate to systems for specimen inspection, and more particularly to semiconductor wafer inspection.

BACKGROUND INFORMATION

Semiconductor devices such as logic and memory devices are typically fabricated by a sequence of processing steps applied to a substrate or wafer. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Inspection processes are used at various steps during a semiconductor manufacturing process to detect defects on both unpatterned and patterned wafers to promote higher yield. As design rules and process windows continue to shrink in size, inspection systems are required to capture a wider range of physical defects with ever smaller minimum defect sizes, while maintaining high throughput.

In addition, memory architectures are transitioning from two dimensional floating-gate architectures to fully three dimensional geometries. In some examples, film stacks and etched structures are very deep (e.g., up to six micrometers in depth, or more). Such high aspect ratio structures create challenges for patterned wafer inspection. The ability to measure defects buried within these structures is critical to achieve desired performance levels and device yield.

Optical inspection techniques have proven effective for high throughput detection of defects associated with two dimensional structures and defects buried within three dimensional structures. Traditionally, defect discovery and inspection recipe optimization are based on the inspection of planar, two-dimensional structures. An optical inspection tool is employed to measure a large number of candidate defects associated with two dimensional structures (e.g., less than one micrometer thick) located at the surface of the wafer. The candidate defects detected by the optical inspection tool are verified by inspecting the identified DOI with a scanning electron microscopy (SEM) tool. This is commonly referred to as SEM review. The SEM tool is able to generate images that allow a user to accurately classify a candidate defect as a nuisance defect (i.e., defects identified by the optical inspection tool that are not really defects) or a defect of interest (DOI). Further, the SEM images allow a user to accurately classify the type of DOI. The result of SEM review is set of labeled defects identifying the location of nuisance defects and DOIs on a wafer and the classification of the DOIs.

In many examples, an inspection recipe for an optical inspection tool is formulated based on the labeled defects identified during SEM review. For inspection tasks that require identifying defects of interest from nuisance events, a successful inspection recipe for a semiconductor layer should maximize the number of detects of interest (DOI) detected while minimizing the number of nuisance events detected. By extension, for inspection tasks that require binning of defects, a successful inspection recipe for a semiconductor layer should maximize the number of correctly binned defects (i.e., correctly classified defects) while minimizing the number of nuisance events detected and the number of incorrectly classified defects.

In one example, nuisance filtering and defect classification based on optical inspection is realized by estimating the values of one or more attributes derived from images of a candidate defect. A trained classification model is employed to identify a DOI from a nuisance defect, classify a DOI, or both, based on the values of the one or more attributes. The classification model is typically trained based on attributes of images of labeled defects collected by the optical inspection system. The classification model is trained using a manual decision tree or a classical machine learning algorithm such as support vector machine (SVM), Random Forest, K-nearest neighbor, etc. In these examples, the one or more attributes derived from the images are manually selected (i.e., conjured by a human). There is no guarantee that the selected attribute or set of attributes optimally captures the desired separation between DOIs and nuisance defects. Further, there is no guarantee that the selected attribute or set of attributes optically classifies the DOIs. Thus, it is highly likely that a classification model trained based on manually selected attributes will underperform. This becomes limiting as inspection applications become more and more challenging.

In another example, nuisance filtering and defect classification based on optical inspection is realized by directly identifying and classifying a defect from images of a candidate defect, rather than attributes of the images. A trained classification model is employed to directly identify a DOI from a nuisance defect, classify a DOI, or both, based on images of the candidate defect. The trained classification model is typically trained based on images of labeled defects collected by the optical inspection system. The classification model is trained using a machine learning algorithm such as a convolutional neural network, deep learning neural network, etc. In these examples, the neural network is able to learn custom features that are optimal for the classification task at hand. However, the computational cost of executing a complex, trained neural network for inline wafer inspection is excessively high. Thus, high throughput at an acceptable cost has not been attained. Furthermore, it has not been possible to integrate human knowledge of defect classification or information beyond the available optical images to enhance the training process. Thus, currently, a classification model trained based on a neural network to operate directly on images cannot benefit from human knowledge or additional signal information that might further improve performance of the trained classifier.

Accordingly, it would be advantageous to develop methods and/or systems for generating defect classification models with improved performance to enhance defect discovery and classification of complex structures and vertical semiconductor devices by optical inspection systems.

SUMMARY

Methods and systems for improved detection and classification of defects of interest (DOI) is realized by estimating the values of one or more automatically generated attributes derived from images of a candidate defect. A statistical classifier is trained to classify defects based on the values of the automatically generated attributes.

In one aspect, automatically generated attributes are determined by iteratively training, reducing, and retraining a deep learning model. The deep learning model relates optical images of candidate defects to a known classification of those defects. The deep learning model is iteratively reduced in complexity. After model reduction, attributes of the reduced model are identified which strongly relate the optical images of candidate defects to the known classification of the defects. The reduced model is subsequently employed to generate values of the identified attributes associated with images of candidate defects having unknown classification. The attribute values are employed by a statistical classifier to classify the candidate defects.

In another aspect, a statistical classifier is trained to relate the values of input nodes to the output nodes of each layer of a trained neural network model. Each statistical classifier is analyzed to guide the reduction of the neural network model. In some examples, each statistical classifier is analyzed to identify whether the corresponding layer adds new information to the neural network model. If the layer does not add substantial new information, the entire layer is eliminated. In another example, each statistical classifier is analyzed to identify whether the nodes of the corresponding layer contribute substantially to the layer. Nodes which make a relatively small contribution to the layer are eliminated. Similarly, filters which make a relatively small contribution to the output of a convolutional layer are eliminated.

The combination of deep learning and independent statistical classifiers to guide the reducing of a deep learning based model provides a direct performance-driven approach to minimize the computational cost of determining attributes without losing performance.

In another further aspect, a statistical classifier is trained based on the values of automatically generated attributes and the values of manually generated attributes of defects having known classification. In this manner, a trained statistical classifier incorporates attributes known to human users to be important indicators of defects, along with attributes determined by mathematical computation to be important indicators of the same defects.

In another further aspect, the training of a statistical classifier is performed in an iterative manner while reducing the number of attributes employed in the training of the defect classifier.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

BRIEF DESCRIPTION OF THE DRAWINGS

FIG. 9 depicts a chart illustrative of a list of attributes ranked based their relative importance as measured by a statistical classifier.

DETAILED DESCRIPTION

Figure 1:
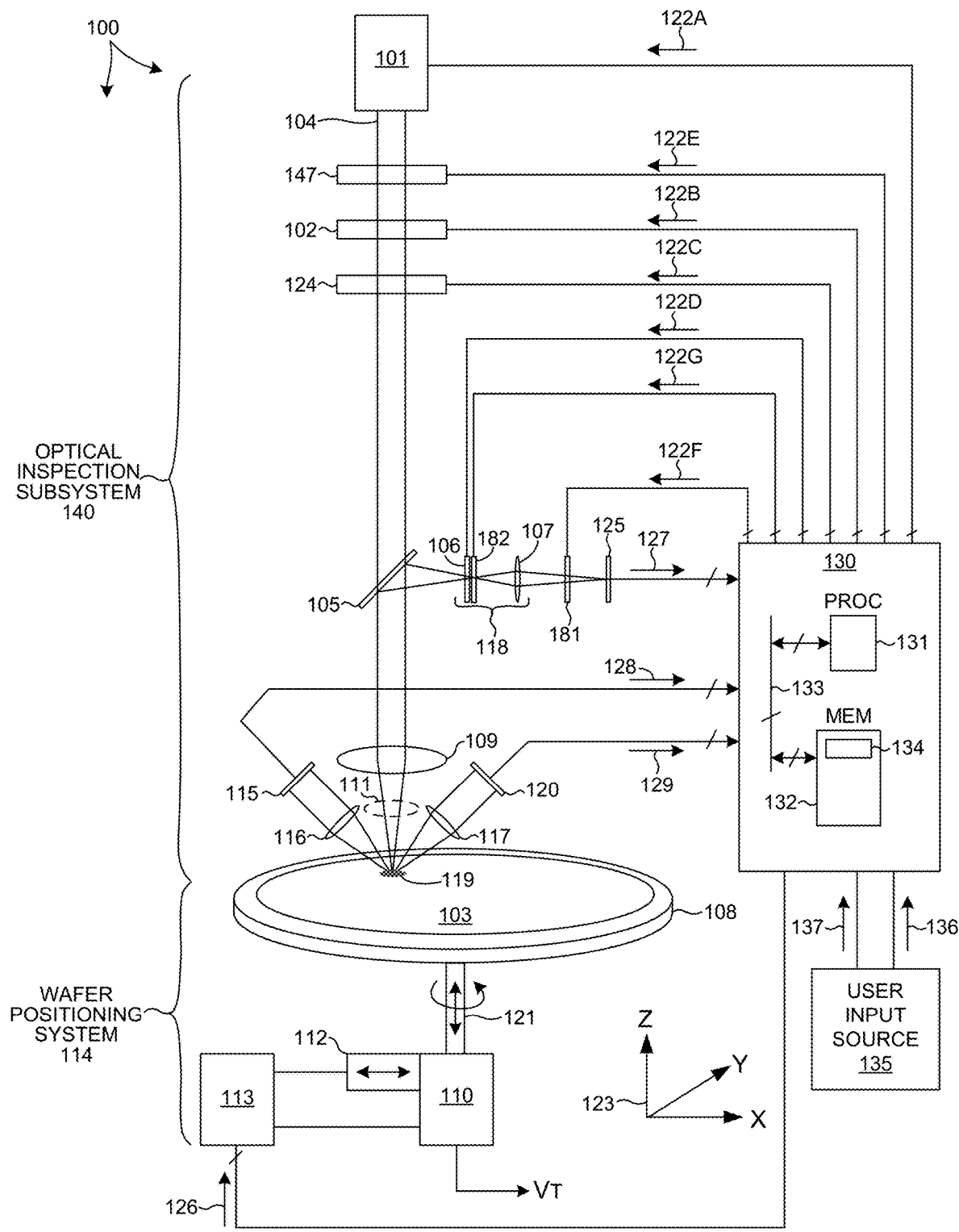
FIG. 1 is a simplified schematic view of one embodiment of an optical inspection system 100 configured to perform defect detection and classification on semiconductor wafers based on images.

Reference will now be made in detail to background examples and some embodiments of the invention, examples of which are illustrated in the accompanying drawings.

Methods and systems for improved detection and classification of defects of interest (DOI) within semiconductor structures are described herein. In particular, nuisance filtering and defect classification based on optical inspection is realized by estimating the values of one or more automatically generated attributes derived from images of a candidate defect. A statistical classifier is trained to classify defects based on the values of the automatically generated attributes.

The automatically generated attributes are determined by iteratively training, reducing, and retraining a deep learning model. The deep learning model relates optical images of candidate defects to a known classification of those defects. The deep learning model is iteratively reduced in complexity, while maintaining sufficient classification performance. After model reduction, attributes of the reduced model are identified which strongly relate the optical images of candidate defects to the known classification of the defects. The reduced model is subsequently employed to generate values of the identified attributes associated with images of candidate defects having unknown classification. The attribute values are employed by the statistical classifier to classify the candidate defects.

In this manner, inline classification of defects is performed by a computationally inexpensive statistical classifier, rather than a computationally expensive, complex neural network operating on detected images. Computationally expensive deep learning is employed during a training phase only, but not during inline inspection. The trained deep learning based model is reduced to minimize over-parameterization and network capacity, and the reduced network is then used for computationally efficient attribute calculation during wafer scan.

Defect classification based on attributes identified based on deep learning enables learning of attributes tailored to specific use cases. In general, desired classification task guides the selection of outputs and the objective function employed during training of the deep learning based model. In this manner, the same data is employed to learn different attributes, each optimally suited for a particular classification task based on the selection of outputs and objective function. In some examples, attributes are learned that best separate one defect type from another (i.e., defect classification). In these examples, the outputs are each of the different defect classes and the objective function forces a binary selection from one of the defect classes for each candidate defect. In some examples, other attributes are learned that best separate nuisance defects from Defects Of Interest (DOIs), i.e., nuisance filtering. In these examples, the outputs are either a DOI or a nuisance defect and the objective function forces a binary selection of one of these two defect classes for each candidate defect.

FIG. 1 is a simplified schematic view of one embodiment of an optical inspection system 100 configured to detect candidate defects and classify defects of interest (DOI) of semiconductor structures. Optical inspection system 100 includes a computing system, a wafer positioning system, and an optical inspection subsystem including an illumination subsystem, a collection subsystem, and one or more detectors. The illumination subsystem includes an illumination source 101 and all optical elements in the illumination optical path from the illumination source to the wafer. The collection subsystem includes all optical elements in the collection optical path from the specimen to each detector. For simplification, some optical components of the system have been omitted. By way of example, folding mirrors, polarizers, beam forming optics, additional light sources, additional collectors, and detectors may also be included. All such variations are within the scope of the invention described herein. The inspection system described herein may be used for inspecting patterned and unpatterned wafers and reticles.

As illustrated in FIG. 1, a wafer 103 is illuminated by a normal incidence beam 104 generated by one or more illumination sources 101. Alternatively, the illumination subsystem may be configured to direct the beam of light to the specimen at an oblique angle of incidence. In some embodiments, system 100 may be configured to direct multiple beams of light to the specimen such as an oblique incidence beam of light and a normal incidence beam of light. The multiple beams of light may be directed to the specimen substantially simultaneously or sequentially.

Illumination source 101 may include, by way of example, a broad band laser sustained plasma light source, a laser, a supercontinuum laser, a diode laser, a helium neon laser, an argon laser, a solid state laser, a diode pumped solid state (DPSS) laser, a xenon arc lamp, a gas discharging lamp, an LED array, and an incandescent lamp. The light source may be configured to emit near monochromatic light or broadband light. In some embodiments, the illumination subsystem may also include one or more spectral filters that may limit the wavelength of the light directed to the specimen. The one or more spectral filters may be bandpass filters and/or edge filters and/or notch filters. Illumination may be provided to the specimen over any suitable range of wavelengths. In some examples, the illumination light includes wavelengths ranging from 260 nanometers to 950 nanometers. In some examples, illumination light includes wavelengths greater than 950 nanometers (e.g., extending to 2,500 nanometers, and beyond) to capture defects in high aspect ratio structures. In some embodiments, the illumination subsystem may also include one or more polarization optics to control the polarization of illumination light directed to the specimen.

Beam 104 generated by illumination source 101 is directed to a beam splitter 105. Beam splitter 105 directs the beam to objective lens 109. Objective lens 109 focuses the beam 111 onto wafer 103 at incident spot 119. Incident spot 119 is defined (i.e., shaped and sized) by the projection of light emitted from illumination source 101 onto the surface of wafer 103.

The inspection system 100 includes illumination aperture 124. As depicted in FIG. 1, computing system 130 communicates command signal 122C to illumination aperture 124. In response, illumination aperture 124 adjusts the illumination direction and beam shape provided onto the surface of the wafer 103. In one embodiment the illumination aperture 124 is an assembly that provides varied aperture shapes controlled by command signal 122C communicated from computing system 130.

As depicted in FIG. 1, computing system 130 communicates command signal 122A to illumination source 101. In response, illumination source 101 adjusts the spectral range(s) of the illumination beam 111. In general, the beam 111 that is incident on wafer 103 may differ from the light emitted by illumination source 101 in one or more ways, including polarization, intensity, size and shape, etc.

In the embodiment depicted in FIG. 1, inspection system 100 includes selectable illumination polarization elements 147. In one example, computing system 130 communicates command signal 122E to illumination polarization elements 147. In response, illumination polarization elements 147 adjust the polarization of the illumination light provided onto the surface of the wafer 103.

As depicted in FIG. 1, inspection system 100 includes an illumination power attenuator 102 that controls the illumination power delivered to wafer 103. In some other embodiments, the illumination power density attenuator is a beam shaping element that resizes the illumination spot 119 to reduce the illumination power density delivered to wafer 103. In some other embodiments, a combination of illumination power reduction and beam sizing is employed to reduce the illumination power density delivered to wafer 103. As depicted in FIG. 1, computing system 130 communicates a control signal 122B to illumination power attenuator 102 to control illumination power based on the images detected by any of detectors 115, 120, and 125. In general, illumination power attenuator 102 is optional. Thus, in some other embodiments, inspection system 100 does not include illumination power attenuator 102.

In some embodiments, system 100 may include a deflector (not shown) in the illumination path. In one embodiment, the deflector may be an acousto-optical deflector (AOD). In other embodiments, the deflector may include a mechanical scanning assembly, an electronic scanner, a rotating mirror, a polygon based scanner, a resonant scanner, a piezoelectric scanner, a galvo mirror, or a galvanometer. The deflector scans the light beam over the specimen. In some embodiments, the deflector may scan the light beam over the specimen at an approximately constant scanning speed.

System 100 includes collection optics 116, 117, and 118 to collect the light scattered and/or reflected by wafer 103 and focus that light onto detector arrays 115, 120, and 125, respectively. The outputs of detectors 115, 120, and 125 are communicated to computing system 130 for processing the signals and determining the presence of candidate defects and their locations.

Any of collection optics 116-118 may be a lens, a compound lens, or any appropriate lens known in the art. Alternatively, any of collection optics 116-118 may be a reflective or partially reflective optical component, such as a mirror. In addition, although particular collection angles are illustrated in FIG. 1, it is to be understood that the collection optics may be arranged at any appropriate collection angle. The collection angle may vary depending upon, for example, the angle of incidence and/or topographical characteristics of the specimen.

Each of detectors 115, 120, and 125 generally function to convert the reflected and scattered light into an electrical signal, and therefore, may include substantially any photodetector known in the art. However, a particular detector may be selected for use within one or more embodiments of the invention based on desired performance characteristics of the detector, the type of specimen to be inspected, and the configuration of the illumination. For example, if the amount of light available for inspection is relatively low, an efficiency enhancing detector such as a time delay integration (TDI) camera may increase the signal-to-noise ratio and throughput of the system. However, other detectors such as charge-coupled device (CCD) cameras, photodiodes, phototubes and photomultiplier tubes (PMTS) may be used, depending on the amount of light available for inspection and the type of inspection being performed. In at least one embodiment of the invention, a photomultiplier tube is used for detecting light scattered from a specimen. Each detector may include only one sensing area, or possibly several sensing areas (e.g., a detector array or multi-anode PMT).

System 100 may employ various imaging modes, such as bright field and dark field modes. For example, in one embodiment, detector 125 generates a bright field image. As illustrated in FIG. 1, some amount of light scattered from the surface of wafer 103 at a narrow angle is collected by objective lens 109. This light passes back through objective lens 109 and impinges on beam splitter 105. Beam splitter 105 transmits a portion of the light to collection optics 118, which in turn focuses the light onto detector 125. In this manner a bright field image is generated by detector array 125. Collection optics 118 includes imaging lens 107 that images the reflected light collected by objective lens 109 onto detector array 125. An aperture 182, Fourier filter 106, or both, are placed at the back focal plane of objective lens 109. Various imaging modes such as bright field, dark field, and phase contrast can be implemented by using different illumination apertures 124, collection apertures, Fourier filters 106, or combinations thereof. The configuration of the imaging mode, such as illumination direction or imaging collection solid angle, can be determined based on DOI signal and collected images. U.S. Pat. Nos. 7,295,303 and 7,130,039, which are incorporated by reference herein, describe these imaging modes in further detail. In another example, detectors 115 and 120 generate dark field images by imaging scattered light collected at larger field angles. U.S. Pat. No. 6,208,411, which is incorporated by reference herein, describes these imaging modes in further detail.

In the embodiment depicted in FIG. 1, inspection system 100 includes selectable collection polarization elements 181. In one example, computing system 130 communicates command signal 122F to collection polarization elements 181. In response, collection polarization elements 181 adjust the polarization of the collected light provided onto the surface of detector 125.

As depicted in FIG. 1, inspection system 100 includes a selectable Fourier filter 106. Computing system 130 communicates command signals 122D to Fourier filter 106. In response, Fourier filter 106 adjusts the Fourier filtering properties of the Fourier filter (e.g., by changing the specific Fourier filter elements located in the collection beam path).

The inspection system 100 includes collection aperture 182. As depicted in FIG. 1, computing system 130 communicates command signal 122G to collection aperture 182. In response, collection aperture 182 adjusts the amount of light collected from the surface of the wafer 103 that is transmitted to the corresponding detector. In one embodiment the collection aperture 182 is an assembly that provides varied aperture shapes controlled by command signal 122G communicated from computing system 130.

System 100 also includes various electronic components (not shown) needed for processing the reflected and/or scattered signals detected by any of detectors 115, 120, and 125. For example, system 100 may include amplifier circuitry to receive output signals from any of detectors 115, 120, and 125 and to amplify those output signals by a predetermined amount and an analog-to-digital converter (ADC) to convert the amplified signals into a digital format suitable for use within processor 131. In one embodiment, the processor may be coupled directly to an ADC by a transmission medium. Alternatively, the processor may receive signals from other electronic components coupled to the ADC. In this manner, the processor may be indirectly coupled to the ADC by a transmission medium and any intervening electronic components.

In the embodiment illustrated in FIG. 1, wafer positioning system 114 moves wafer 103 under beam 111 based on commands 126 received from computing system 130. Wafer positioning system 114 includes a wafer chuck 108, motion controller 113, a rotation stage 110, translation stage 112, and z-translation stage 121. Z-translation stage 121 is configured to move wafer 103 in a direction normal to the surface of wafer 103 (e.g., the z-direction of coordinate system 123). Translation stage 112 and rotation stage 110 are configured to move wafer 103 in a direction parallel to the surface of wafer 103 (e.g., the x and y directions of coordinate system 123). In some other embodiments, wafer 103 is moved in the in-plane directions (e.g., x and y directions) by the coordinated motion of multiple translation stages.

Wafer 103 is supported on wafer chuck 108. In some embodiments, wafer 103 is located with its geometric center approximately aligned with the axis of rotation of rotation stage 110. In this manner, rotation stage 110 spins wafer 103 about its geometric center at a specified angular velocity, $\omega$, within an acceptable tolerance. In addition, translation stage 112 translates the wafer 103 in a direction approximately perpendicular to the axis of rotation of rotation stage 110 at a specified velocity, $V_T$. Motion controller 113 coordinates the spinning of wafer 103 by rotation stage 110 and the translation of wafer 103 by translation stage 112 to achieve a desired in-plane scanning motion of wafer 103 within inspection system 100. In addition, motion controller 113 coordinates the movement of wafer 103 by translation stage 121 to achieve a desired out-of-plane scanning motion of wafer 103 within inspection system 100.

Wafer 103 may be positioned relative to the optical subsystems of inspection system 100 in a number of different modes. In an inspection mode, wafer 103 is repeatedly scanned in the lateral directions (e.g., x-direction and y-direction) for two dimensional scans. In addition, wafer 103 may be repeated scanned in the lateral directions at different z-positions for three dimensional scans. In some examples, wafer 103 is scanned at two or more different z-positions, corresponding to two or more depths (e.g., distance below wafer surface) through a layered structure. In a defect review mode, wafer 103 is positioned in a fixed position in the x-direction and y-directions, while scanning in the z-direction. In this manner, three dimensional images are generated based on measurement data at a fixed lateral position of wafer 103 over a range of depths within the structure under measurement. Defect review mode is typically employed to perform more detailed investigation of defects (e.g., higher image resolution, higher focal depth resolution, or both).

In some embodiments, the wafer is moved to a number of different z-positions with respect to the focal plane of the inspection system to image different depths of the wafer stack. In some other embodiments, the position of the focal plane of the inspection system is adjusted optically to a number of different z-positions with respect to the wafer to image different depths of the wafer stack. In some examples, the images collected at each z-position are aggregated to form a three dimensional volume image of a thick semiconductor structure measured in two lateral dimensions (e.g., parallel to the wafer surface) and a number of different depths (i.e., different z-positions).

In general, the optical subsystem 140, including both the illumination and collection subsystems, generates a focused optical image at each of a plurality of focus planes located at a plurality of different depths of a structure under measurement (e.g., a vertically stacked structure). The alignment of the focus plane of the optical subsystem at each different depth is achieved by optical adjustment that moves the focus plane in the z-direction, specimen positioning in the z-direction, or both. One or more detectors detect the light collected at each of the plurality of different depths and generate a plurality of output signals indicative of the amount of light collected at each of the plurality of different depths.

In some examples, optical inspection system 100 generates three dimensional images of a thick semiconductor structure from a volume measured in two lateral dimensions (e.g., parallel to the wafer surface) and a depth dimension (e.g., normal to the wafer surface). In the embodiment depicted in FIG. 1, computing system 130 arranges the outputs from one or more of the measurement channels (e.g., from one or more of detectors 115, 120, and 125) into a volumetric data set that corresponds to the measured volume.

In a defect review example, a series of images are acquired at the same (x,y) location for a number of different wafer locations within the focal plane of the inspection system. In this example, computing system 130 generates a three-dimensional image of the measured volume by assembling a stack of the series of two-dimensional images acquired at each different focus offset. Focus offset is the relative distance between the most reflective surface of the specimen and the focal plane of the inspection system. In general, the parameter to be scanned is not limited to the focus offset. In other examples, sensor axial position, spectral band, illumination direction, etc., can be scanned to form a three-dimensional defect image. In some embodiments, a defect image having more than three dimensions is generated by computing system 130. In one example, both focus offset and illumination direction are scanned for a given (x,y) location. In one example, computing system 130 generates a four dimensional image of the measured volume by assembling the series of two-dimensional images acquired at each different focus offset and each different illumination angle into a fourth order tensor. In some examples, a series of images for a predefined set of focus offsets is collected while keeping illumination intensity and other system parameters unchanged.

In general, defects are detected from images by applying a defect detection algorithm. In some embodiments, defect detection is performed directly from image data generated by inspection system 100. In some embodiments, one or more attribute vectors are extracted from the collected image data and defect detection is performed based on the measured attribute vectors. In general, an attribute vector is an n-dimensional vector of numerical attributes that represent an object (e.g., defect of interest, nominal structure, etc.). In some examples, a defect detection algorithm includes one or more selectable threshold values that adjust the sensitivity of the defect detection algorithm. When highly restrictive threshold values are selected, the defect detection algorithm detects fewer defects of interest from a set of images. When highly permissive threshold values are selected, the defect detection algorithm detects more defects of interest from the same set of images. It is likely that real defects will be missed if too few defects are detected, and many nuisance (e.g., false) defects will be captured if too many defects are detected. Thus, an optimized measurement recipe tuned to a particular measurement application includes a selection of detection algorithm threshold values that maximizes the capture rate of real defects, while minimizing the capture rate of nuisance (i.e., false) defects.

As described with respect to FIG. 1, computing system 130 generates and communicates command signals 122A-G such that illumination power, illumination apertures, collection apertures, spectral band, Fourier filters, illumination polarization, collection polarization, or any combination thereof, are selected in accordance with a specified optical mode. In addition, an inspection system such as inspection system 100 includes other selectable optical system settings such as angle of incidence, azimuth angle, etc. Each distinct combination of optical system settings is referred to as a distinct optical mode of the optical inspection system 100.

In practice, an optimal optical mode is selected for a particular measurement application to achieve one or more performance objectives. Exemplary performance objectives include, but are not limited to minimizing the response of the nominal structure in the detected images, enhancing the response of the defect signal in the detected images, minimizing the response of wafer noise or nuisance signals in the detected images, discriminating the response of the defect from wafer noise or the nuisance signals in detected images, improving the accuracy of estimated physical location of the defect from the detected images, or any combination thereof.

In the embodiment depicted in FIG. 1, information about the measurement application 136 under consideration is received by computing system 130 from a user input source 135. Typically, the user input source 135 is an entity such as a user or operator having knowledge of the structures under inspection and expected defects. By way of non-limiting example, structural information 136 includes expected stack depth of defect of interest, wafer level signature of defect of interest, refractive index of the 3-D stack, etc. In one embodiment, inspection system 100 includes peripheral devices useful to accept inputs from an operator (e.g., keyboard, mouse, touchscreen, communication ports, etc.) to communicate structural information 136 from the user to inspection system 100.

In some embodiments, a user also communicates an initial set of optical modes for inspection system 100. A user of inspection system 100 typically performs preliminary modeling or employs past experience to arrive at an initial set of optical modes of inspection system 100, which are most likely to result in the best inspection results. Typically, an initial set of optical modes includes tens of different optical modes, but far fewer than the thousands of available optical modes. In some examples, a user also communicates one or more initial focus levels to inspection system 100. The one or more initial focus levels include focus levels where defects of interest should be located.

In response to user inputs 136 and 137, inspection system 100 performs an inspection of wafer 103 at each of the initial set of optical modes and at each of the one or more initial focus levels. Typically, the inspections are run in a scanning mode, where a large area of the wafer (e.g., the entire area of the wafer) is inspected at each of the one or more initial focus levels. Threshold values of the defect detection algorithm employed during the initial inspections set at highly permissive values that identify many candidate defects (i.e., both real and nuisance defects). For example, FIG. 2 depicts candidate defects identified by inspection system 100 on wafer 103.

Figure 2:
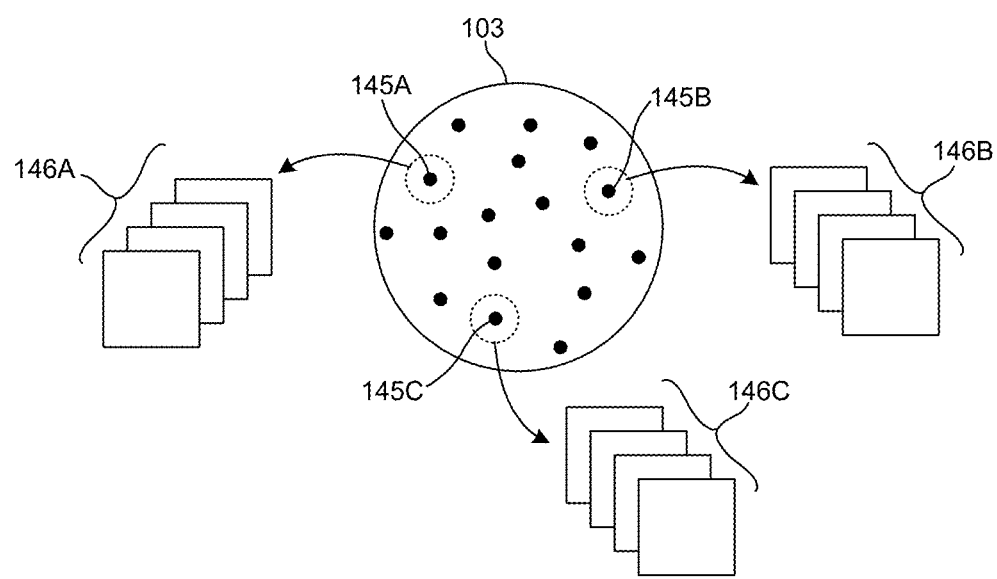
FIG. 2 is a diagram illustrative of a wafer including candidate defects and images collected at or near selected candidate defects.

After performing the initial inspections, computing system 130 selects a few of the most promising candidate defects identified in the initial inspections (e.g., candidate defects 145A-C depicted in FIG. 2). The most promising defects are defects of interest that most closely match the expected defects provided by the user of inspection system 100.

In some embodiments, inspection system 100 performs a through focus review of the selected defects of interest by locating the wafer 103 with respect to optical inspection subsystem 140 such that a selected defect of interest is in the field of view of inspection system 100. A series of measurements are performed at a number of focus levels all the way through the structure under measurement. Based on the results of the through focus review, computing system 130 determines one or more focus planes or focus range that best capture the defect of interest. In some examples, the one or more focus planes or focus range is determined based on a best match between a measured defect signature (e.g., image or attribute vector) and an expected defect signature.

After determining the one or more focus planes or focus range, inspection system 100 records image patches (e.g., 32×32 pixel patches, 64×64 pixel patches, etc.) associated with defect locations identified in each of the initial inspections at the one or more focus planes or focus range, rather than throughout the entire depth of the structure. FIG. 2 depicts sets of image patches 146A-C associated with candidate defects 145A-C, respectively. In some examples, one hundred million defect locations, or more, are imaged at multiple focus levels, and recorded. In this manner, the amount of recorded data associated with defect discovery is limited to a subset of depths. The recorded data are employed during subsequent defect verification and classifier training processes. By limiting the amount of recorded data, subsequent defect verification and classifier training processes are dramatically simplified.

In another aspect, verified defect images and associated defect classification are mapped to corresponding defects identified by inspection system 100. The verified defects including associated recorded images and defect classification are employed to train a nuisance filter, a statistical classifier, or both.

Figure 3:
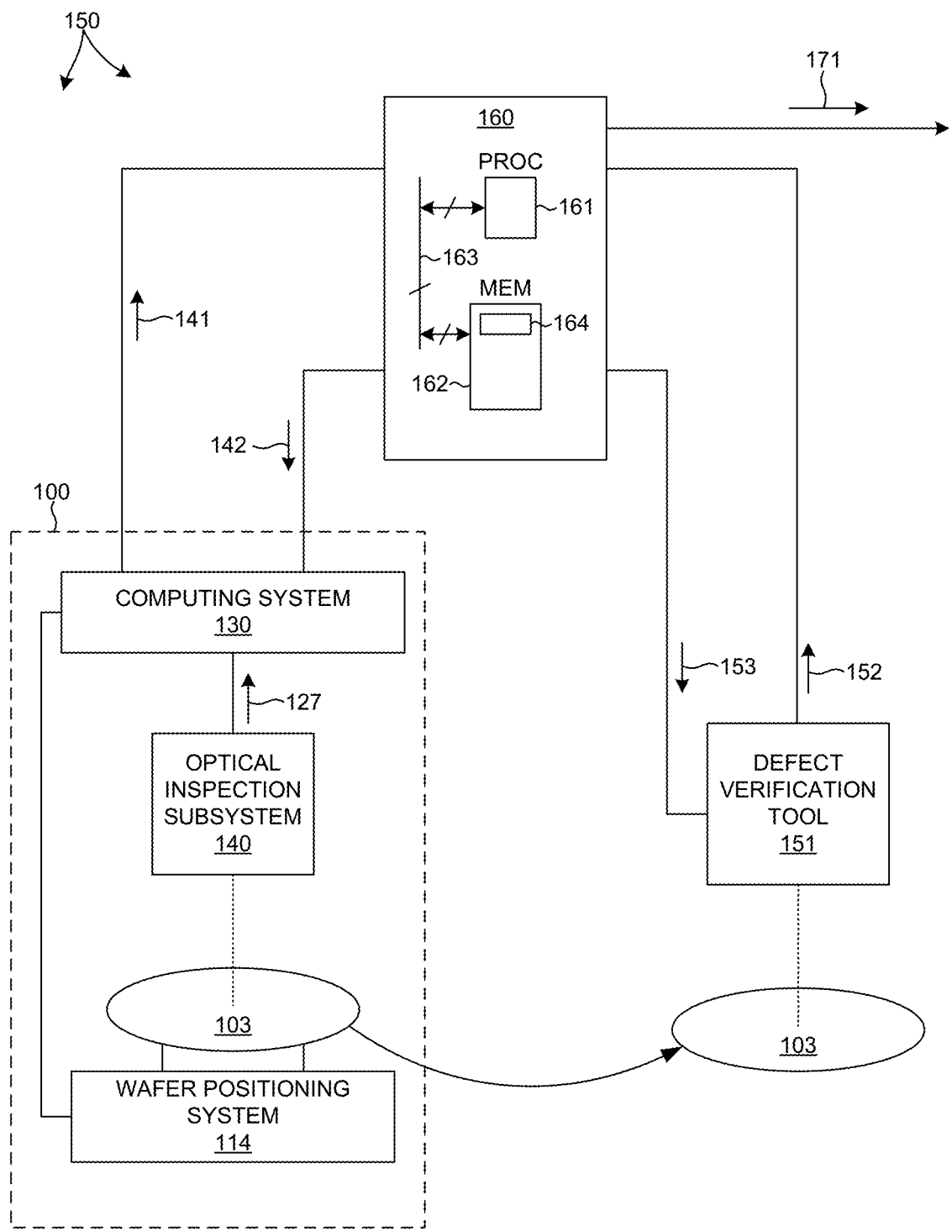
FIG. 3 is a simplified schematic view of one embodiment of a system configured to classify defects for a particular measurement application.

FIG. 3 is a simplified schematic view of one embodiment of a system 150 for defect discovery and verification for inspection of semiconductor structures. The system 150 includes inspection system 100 as described with reference to FIG. 1, a defect verification tool 151, and a computing system 160. In some embodiments, the task performed by computing system 160 are as described herein are implemented by computing system 130, or another computing system.

In some embodiments, defect verification tool 151 is an electron beam based analysis tool. In some other embodiments, defect verification tool 151 is an x-ray based analysis tool. In these embodiments, a material removal tool may not be necessary to make the buried defect visible to the x-ray based analysis tool. Thus, an associated material removal tool is optional.

In some examples, defect verification is achieved by de-processing wafer 103 and inspecting the exposed defects with inspection system 100. In these examples, a different defect verification tool 151 may not be required. In some embodiments, a defect verification tool, such as a SEM review tool may be integrated with inspection system 100 as a single wafer processing tool, or, alternatively, separated into different wafer processing systems individually, or in any combination.

Computing system 130 coordinates the inspection processes, and performs analyses, data handling, and communication tasks. Similarly, computing system 160 coordinates the material removal and review processes, performs analyses, and performs data handling and communication tasks.

Defect verification can be accomplished in many different ways. In some embodiments, voltage contrast inspection is performed to verify defects. In these embodiments, a wafer is decorated in accordance with a small sample plan and voltage contrast measurements are performed on the decorated wafer by a voltage contrast inspection tool.

In some other embodiments, wafer fabrication is completed and a bit-map test is performed on the finished wafer to verify defects.

In some other embodiments, a wafer is de-processed to remove layers of the multiple layer structure under consideration. De-processing may be accomplished by chemical processes, mechanical processes, or both. In on example, a focused ion beam (FIB) tool is employed to remove material from the surface of a wafer. The wafer is de-processed until the buried defects are located at or near the surface of the wafer and can be effectively imaged by defect verification tool 151, e.g., a SEM review tool, inspection system 100, etc. Defect locations and associated defect images 152 associated with defect verification measurements are stored in a memory (e.g., memory 162 on board computing system 160). In some embodiments, the defect information is stored in the form of a KLA results file (KLARF). The KLARF file is a flat ASCII file produced by the defect verification tool 150. The same KLARF file format is used to save defect information from inspection system 100.

In a further aspect, defect information 141 associated with defects identified by inspection system 100 as part of defect discovery is communicated to computing system 160. Computing system 160 samples the identified defects to generate a diversity set of candidate defects 153 communicated to defect verification tool 151. In some embodiments, computing system 160 bins the defects identified by inspection system 100 during defect discovery (e.g., 100 million or more DOIs) and selects a few defects from each bin to generate the diversity set of candidate defects 153. The diversity set of candidate defects 153 are saved in a memory (e.g., memory 162 on board computing system 160).

Defect verification measurements are performed on the diversity set of candidate defects. The defect locations, defect classification, and associated defect images from the defect verification measurements are stored in a memory (e.g., memory 162 on board computing system 160). The defect classification may be performed with the assistance of a human user or automatically. The defect classification identifies the defect as a nuisance defect or a defect of interest (DOI). If the defect is classified as a DOI, the specific classification of the defect is identified. In some embodiments, the defect location, classification, and associated defect images associated with the diversity set of candidate defects is also stored in a KLARF file format.

Defect verification data from the diversity set of candidate defects, any other set of verified defects, or a combination thereof, are mapped to the saved defect image patches as labeled defect data 171. The defect verification data and the corresponding defect image patches are employed to train a nuisance filter, defect classifier, or both.

In one aspect, a statistical classifier is trained to classify defects based on values of automatically generated attributes determined from defect images by an attribute identification module.

Figure 4:
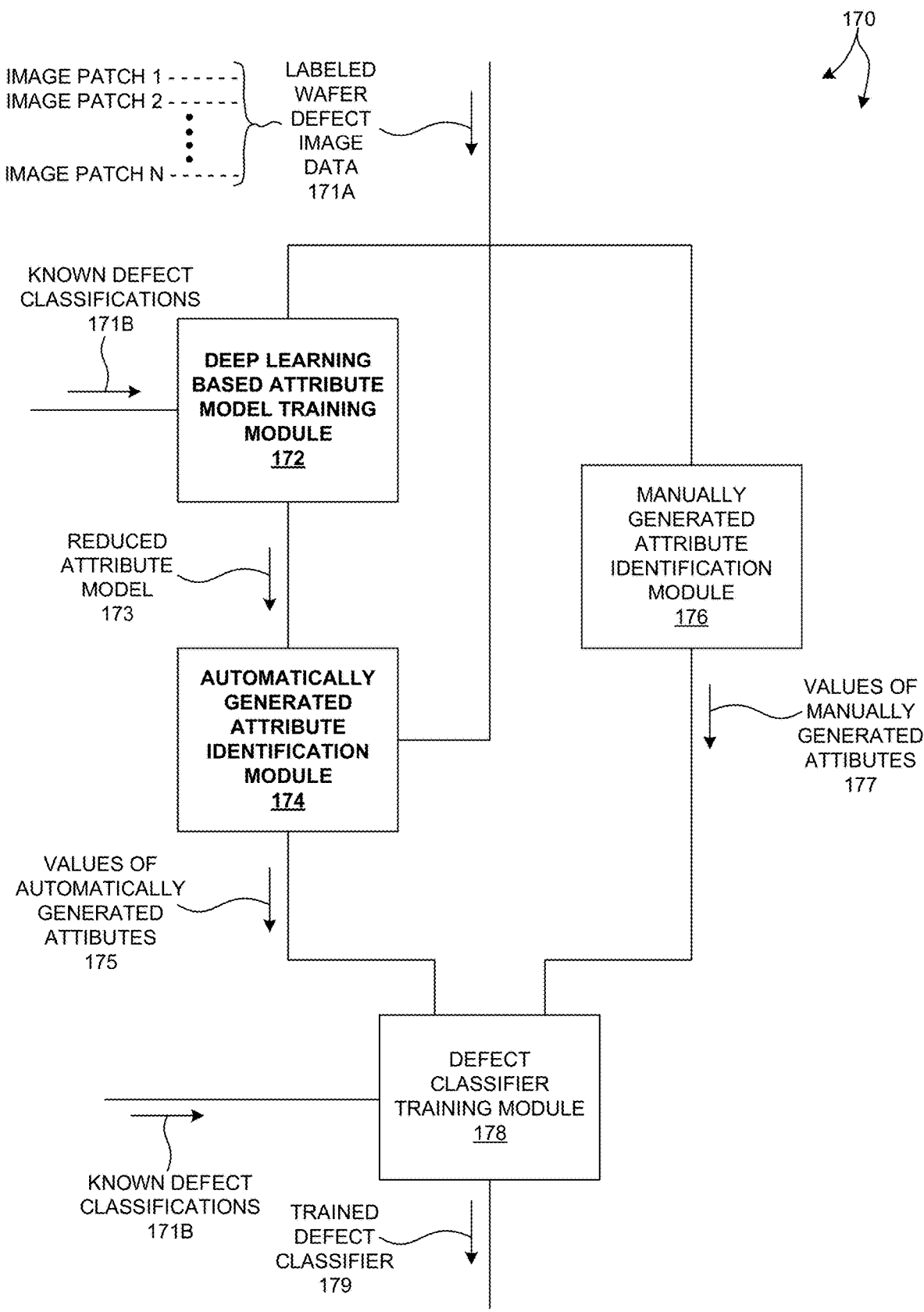
FIG. 4 is a diagram illustrative of a defect classifier training engine in one embodiment.

FIG. 4 is a diagram illustrative of a defect classifier training engine 170 in one embodiment. As depicted in FIG. 4, a deep learning based attribute model training module 172 receives image data 171A (e.g., image patches) associated with verified wafer defects along with the known classification 171B of each defect. The image data 171A and classification 171B associated with each defect is extracted from labeled defect data 171.

The image data employed to train a classifier based on automatically generated attributes may be associated with each defect instance, individually, in combination with other instances of the same nominal structure, or both. In some examples, image data employed to train a classifier based on automatically generated attributes may be associated with defects on a test wafer, corresponding defect locations on a reference wafer, a difference between defect images on the test and reference wafers, or a combination thereof.

In some examples, the image data is associated with a particular instance of semiconductor structure. In some examples, the image data is associated with two different instances of the same nominal semiconductor structure. In some other examples, the image data is associated with a difference image (i.e., pixel by pixel difference) between the two different instances of the same nominal semiconductor structure. In some examples, the two different instances of the same nominal structure are the same nominal structure fabricated on different die on the same wafer. In some examples, the two different instances of the same nominal structure are the same nominal structure fabricated on different die on different wafers.

Figure 5:
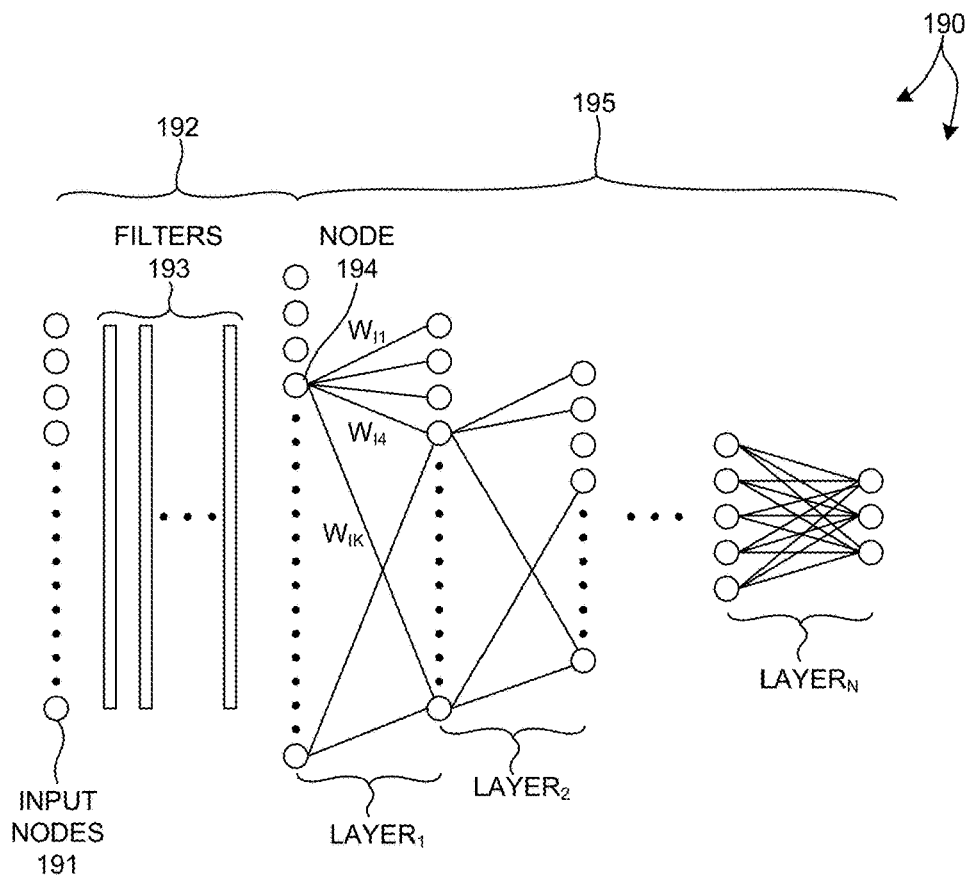
FIG. 5 depicts a simplified illustration of a neural network model employed to identify attributes of defect images useful for defect classification.

Deep learning based attribute model training module 172 generates a deep learning based model having defect image data as input and the known classification of the defect as output. In some embodiments, the deep learning based model is a neural network model including at least one convolutional layer including a number of image filters and at least one connected layer including a number of nodes (i.e., neurons). FIG. 5 depicts a simplified illustration of a neural network model 190 including a set of input nodes 191 corresponding to the image pixels of each image patch under consideration. For example, if 32×32 pixel image patches are employed, the number of input nodes 191 is 32*32.

Neural network model 190 includes a convolutional layer 192 and N connected layers 195. The convolutional layer includes a number of filters 193 (e.g., 32 filters) that operate on the image data present on input nodes 191. The output of each of the filters is present on the input nodes of $LAYER_1$. In one example, if 32×32 pixel image patches and 32 filters are employed, the number of nodes of $LAYER_1$ is 32*32*32. However, in general, different pooling schemes may be employed that reduce the number of nodes at the output of the convolutional layer. Each connected layer includes a set of input nodes and a set of output nodes. A set of weights relate each input node of a connected layer to the output nodes of the connected layer. As depicted in FIG. 5, node 194 is an input node of $LAYER_1$ and node 194 is coupled to each of the output nodes of LAYER1 by a set of weights (e.g., $W_{J1}$-$W_{JK}$). In some examples, the connected layers are fully connected (i.e., each input node is connected to each output node by a weighting value) as illustrated by $LAYER_N$. In some examples, the connected layers are sparsely connected (i.e., not all of the input nodes are connected to all of the output nodes).

In general, neural network model 190 is presented by way of non-limiting example. Other deep learning models may be contemplated within the scope of this patent document. For example, neural network model 190 may include any number of convolutional layers, any number of connected layers, or both.

The neural network model 190 is trained based on the defect image data and corresponding classification. For example, each of the output nodes of the last connected layer of neural network 190 (e.g., $LAYER_N$) correspond to a different classification. For example, as illustrated in FIG. 5, there are three output nodes of $LAYER_N$, each corresponding to a different defect classification. For example, the values of the output nodes of $LAYER_N$ for a defect having a known classification, Class1, are ideally {1, 0, 0}. The values of the output nodes of $LAYER_N$ for a defect having a known classification, Class2, are ideally {0, 1, 0}. The values of the output nodes of $LAYER_N$ for a defect having a known classification, Class3, are ideally {0, 0, 1}. During model training the weights of each connected layer and the filter values of each filter of the convolutional layer are adjusted to most closely achieve the ideal model output associated with the known classification of all of the imaged defects under consideration.

In some examples, the neural network model is trained to identify attributes associated with a nuisance filter. In these examples, there are two output nodes of $LAYER_N$. In this example, the values of the output nodes of $LAYER_N$ for a nuisance defect are {1, 0}, and the values of the output nodes of $LAYER_N$ for a DOI are {0, 1}. In this manner, the neural network may be trained to identify attributes associated with different classification objectives based on the same image data by tuning the structure of the neural network model and the performance objective function employed to drive model training.

In principle, the trained neural network model may be employed to directly classify defects based on collected image data as part of an inline inspection process. However, the computational cost of implementing such a model is prohibitive in the context of high throughput semiconductor wafer inspection.

In a further aspect, the trained neural network model is reduced in complexity, typically in an iterative manner, to arrive at a smaller dimension model that retains the predictive capability of the original model. In some embodiments, the neural network model is reduced by reducing the number of model layers (convolutional layers, connected layers, or both), reducing the number of image filters of the convolutional layer, reducing the number of nodes associated with one or more connected layers, or any combination thereof. After a reduction step is performed, the reduced neural network model is retrained on the same image data and known classifications. The performance of the reduced neural network model is compared with the original model by comparing the residuals of the performance objective function driving the training process. The neural network model is iteratively reduced until the performance of the reduced neural network model differs substantially from the performance of the originally trained model.

Figure 6:
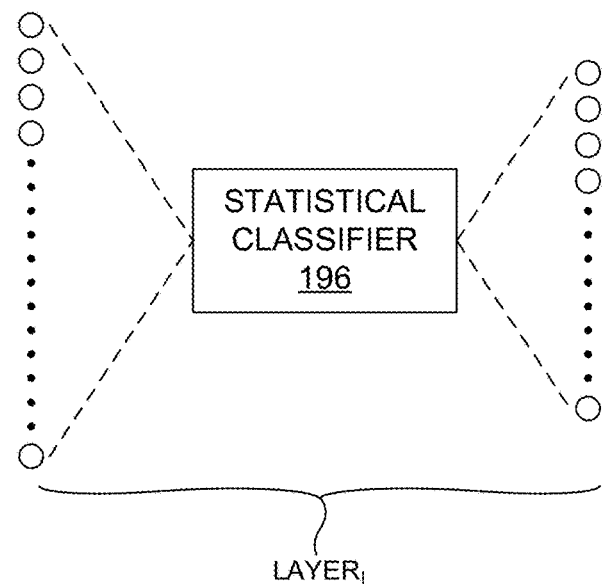
FIG. 6 depicts a simplified illustration of a statistical classifier trained to emulate a layer of a trained neural network model.

In another aspect, a statistical classifier is trained to relate the values of input nodes to the output nodes of each layer of a trained neural network model. For example, FIG. 6 depicts a statistical classifier 196 trained to emulate LAYER$_I$. Each statistical classifier is analyzed to guide the reduction of the neural network model. In some examples, each statistical classifier is analyzed to identify whether the corresponding layer adds new information to the neural network model. If the layer does not add substantial new information, the entire layer is eliminated. In another example, each statistical classifier is analyzed to identify whether the nodes of the corresponding layer contribute substantially to the layer. Nodes which make a relatively small contribution to the layer are eliminated. Similarly, the input nodes of LAYER$_1$ are analyzed based on a statistical classifier trained to emulate LAYER$_1$. Input nodes of LAYER$_1$ found to not contribute substantially to LAYER$_1$ indicate which filters of the convolutional layer do not contribute substantial new information to the model. These filters are eliminated.

The combination of deep learning and independent statistical classifiers to guide the reducing of a deep learning based model provides a direct performance-driven approach to minimize the computational cost of determining attributes without losing performance.

In general, other approaches to reducing the deep learning based model are contemplated within the scope of this patent document. For example, implementing traditional weight sparsity analysis and activation maps, alone, or in combination with trained statistical classifiers, may be employed to achieve model reduction with minimal performance impact.

In another further aspect, values of automatically generated attributes associated with each training image, or set of images, are extracted from a reduced deep learning model. As depicted in FIG. 4, deep learning based attribute model training module 172 generates a reduced attribute model 173. The reduced attribute model 173 is the trained deep learning based model after the final model reduction step.

An automatically generated attribute is an element, or combination of elements, of reduced attribute model 173. In one example, an automatically generated attribute is the maximum pixel intensity of an input image filtered by one or more of the filters 193 of the convolutional layer 192. In another example, an automatically generated attribute is the value of a node, or combination of nodes, of one or more connected layers. In general, attributes extracted from reduced attribute model 173 are elements of reduced attribute model 173 that exhibit the greatest sensitivity to particular classification application.

Automatically generated attribute identification module 174 determines values 175 of each automatically generated attribute for each wafer defect image, or combination of images by calculating the value of the attribute derived from one or more elements of reduced attribute model 173 for each wafer defect image.

In another aspect, a statistical classifier is trained based on the values of automatically generated attributes of defects having known classification. As depicted in FIG. 4, the values 175 of automatically generated attributes associated with labeled defect data 171 are communicated to defect classifier training module 178. In addition, known defect classifications 171B corresponding to the labeled defect data are also communicated to defect classifier training module 178. Defect classifier training module 178 trains a statistical model that predicts the classification of a defect based on the values of the automatically generated attributes associated with the defect. In general, the statistical model may be any suitable model (e.g., decision tree, support vector machine (SVM), Random Forest, K-nearest neighbor, etc.). The trained defect classifier 179 is communicated from the defect classifier training module 178.

In another further aspect, the statistical classifier is trained based on the values of automatically generated attributes and the values of manually generated attributes of defects having known classification. As depicted in FIG. 4, the values of automatically generated attributes 175 and the values of manually generated attributes 177 associated with labeled defect data 171 are communicated to defect classifier training module 178. Defect classifier training module 178 trains a statistical model that predicts the classification of a defect based on the values of the automatically and manually generated attributes associated with the defect as described hereinbefore.

In this manner, a trained statistical classifier incorporates attributes known to human users to be important indicators of defects, along with attributes determined by mathematical computation to be important indicators of the same defects. Importantly, some manually generated attributes are associated with input sources different from the optical patches used for training attribute model 173 (e.g., GDS data, metrology measurements, etc.) In some examples, a manually generated attribute is associated with the entire image frame collected by the inspection system, rather than the image patches.

As depicted in FIG. 4, the values of manually generated attributes 177 are determined by manually generated attribute identification module 176 based on the wafer defect image data 171A.

Manually generated attributes of defects include attributes of defects conjured by a human, rather than a machine. For example, manually generated attributes include pixel brightness magnitude, MDAT offset, MDAT gray level (reference gray level), and energy. In addition, a manually generated attribute may include an attribute of the defect that is responsive to a characteristic (e.g., intensity) of light from the defect detected during a scan or even a relative response between a group of pixels. The manually generated attribute of the defect can be as general as possible. It could include non-intensity type attributes such as defect location, defect size, etc. It could include design attributes (i.e., reference geometry and material specifications) derived from Graphic Database System (GDS) files or other sources.

In another aspect, a trained defect classifier is employed to classify defects based on values of automatically generated attributes derived from images of defects having unknown classification.

Figure 7:
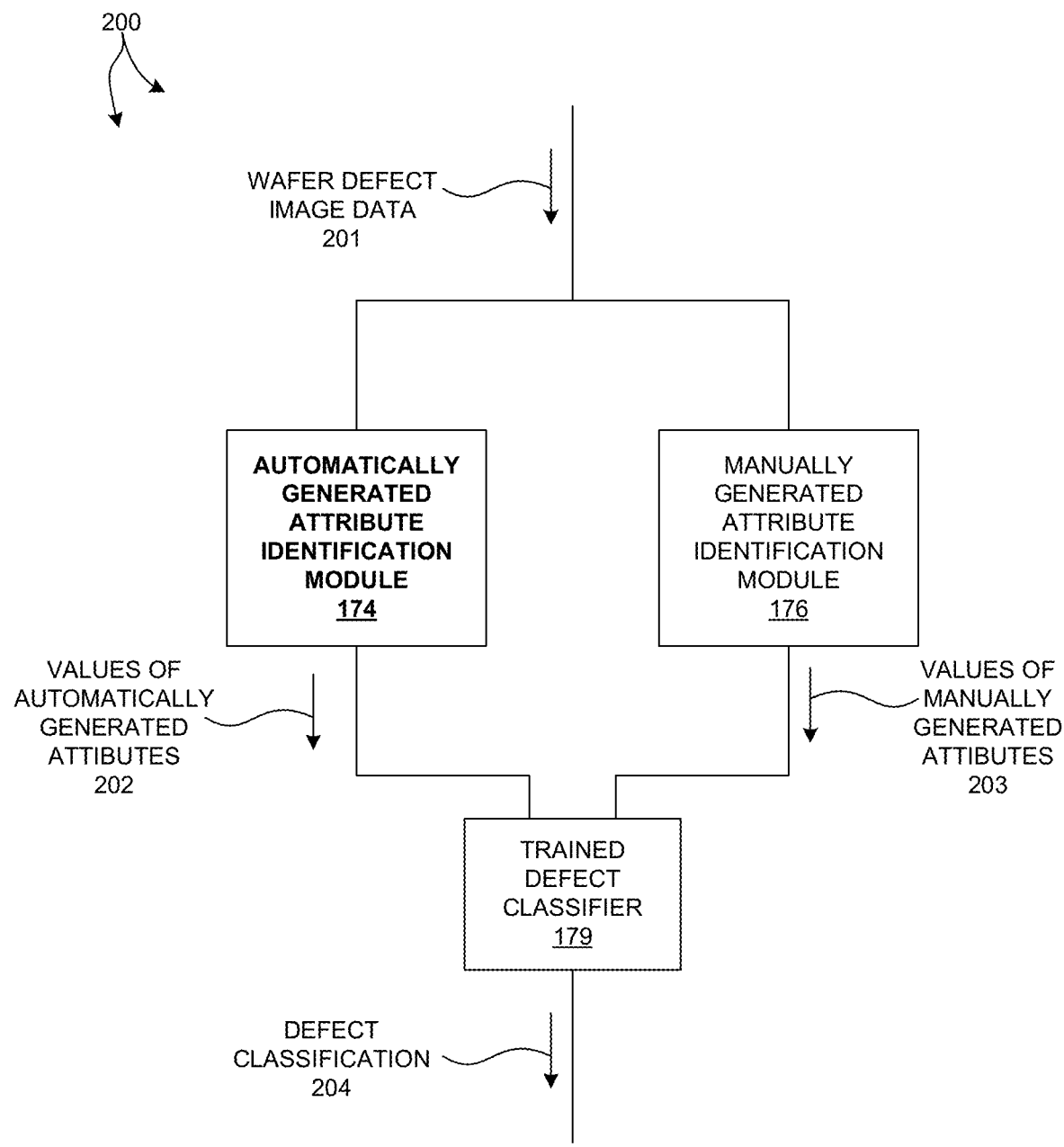
FIG. 7 depicts an illustration of a defect classification engine 200 in one embodiment.

FIG. 7 depicts an illustration of a defect classification engine 200 in one embodiment. Image data 201 associated with a candidate defect having unknown classification is communicated to automatically generated attribute identification module 174 described with reference to FIG. 4. Values of automatically generated attributes 202 associated with the unclassified defect are determined based on the defect image data 201 by automatically generated attribute identification module 174 using the same reduced attribute model 173 described with reference to FIG. 4. In some embodiments, the values of the automatically generated attributes 202 are communicated to trained defect classifier 179, and trained defect classifier 179 determines the classification 204 of the imaged defect based on the values automatically generated attributes 202. In these embodiments, trained defect classifier 179 is trained based only on automatically generated attributes as described with reference to FIG. 4.

In some other embodiments, image data 201 is also communicated to manually generated attribute identification module 174 as described with reference to FIG. 4. Values of manually generated attributes 202 associated with the unclassified defect are determined based on the defect image data 201 by manually generated attribute identification module 174 as described with reference to FIG. 4. In these embodiments, the values of the automatically generated attributes 202 and the values of manually generated attributes 203 are communicated to trained defect classifier 179, and trained defect classifier 179 determines the classification 204 of the imaged defect based on the values 202 and 203. In these embodiments, trained defect classifier 179 is trained based on the combination of automatically generated attributes and manually generated attributes as described with reference to FIG. 4.

Figure 8:
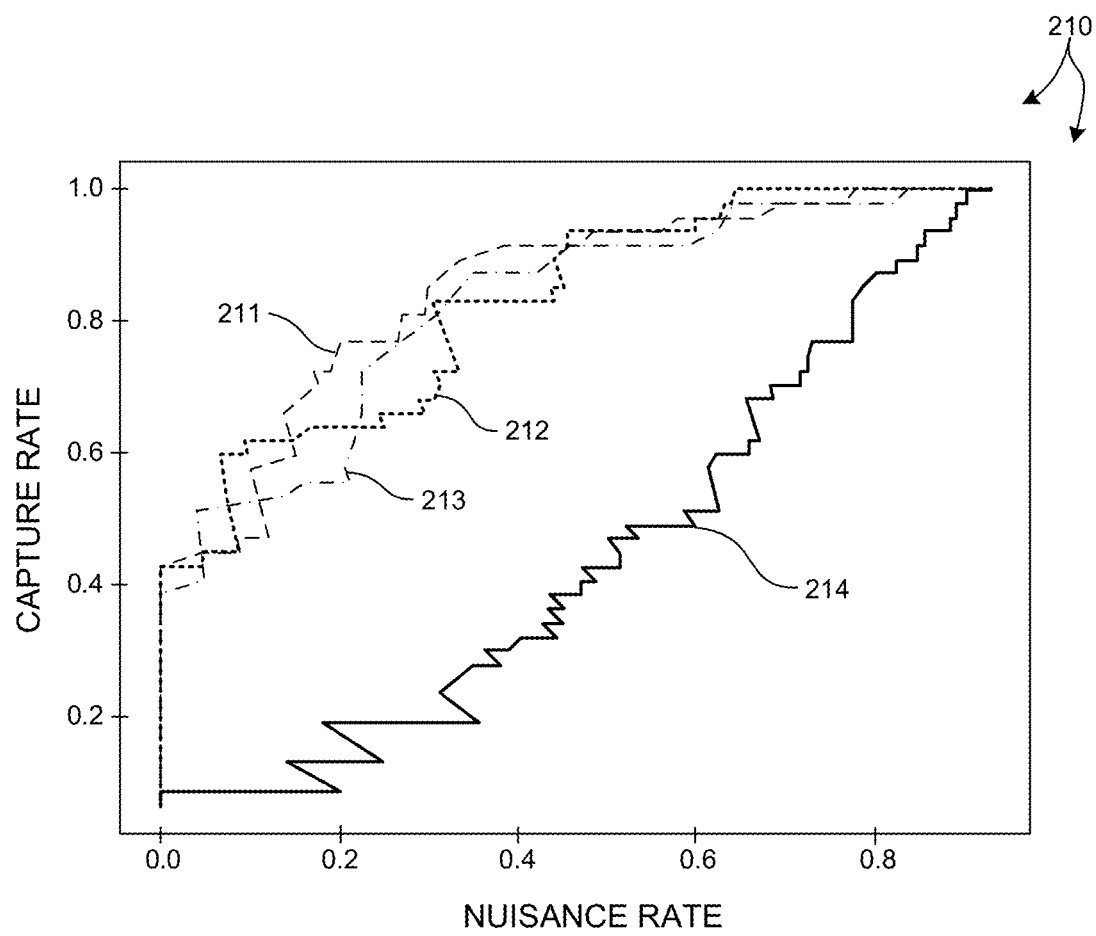
FIG. 8 depicts a plot of the capture rate versus the nuisance rate associated with defects of known classification based on different classifiers.

FIG. 8 depicts a plot 210 of the capture rate versus the nuisance rate associated with defects of known classification based on different classifiers. The inspection application is classification of defects on a copper metal layer after a chemical mechanical polish (CMP) process step. Plotline 214 depicts the classification results achieved with a statistical classifier trained using manually generated attributes only. Plotline 212 depicts the classification results achieved with a statistical classifier trained using both manually generated attributes and automatically generated attributes as described herein. Plotline 210 depicts the classification results achieved with a single layer convolutional neural network trained to classify defects directly based on image data. Similarly, plotline 211 depicts the classification results achieved with a double layer convolutional neural network trained to classify defects directly based on image data.

The use of a trained convolutional neural network to directly classify defects based on image data is currently unsuitable for high throughput inline inspection due to computational cost. However, the classification results achieved with a statistical classifier trained using both manually generated attributes and automatically generated attributes compares favorably with these computationally intensive techniques. In addition, FIG. 8 illustrates the improvement in classification performance achieved with a statistical classifier trained using both manually generated attributes and automatically generated attributes compared to a statistical classifier trained using only manually generated attributes.

FIG. 9 depicts a chart 220 illustrative of a list of attributes ranked based their relative importance as measured by a statistical classifier trained using both manually generated attributes and automatically generated attributes for the inspection application described with reference to FIG. 8. As depicted in FIG. 9, only the attributes labeled "Spot Likeness" and "Patch Defect Signal" are manually generated attributes. All of the other attributes are automatically generated. As depicted in FIG. 9, many of the automatically generated attributes rank significantly higher than the manually generated attributes for this particular inspection application.

In another further aspect, the training of a statistical classifier as described with reference to FIG. 4 may be performed in an iterative manner by iteratively reducing the number of attributes employed in the training of the classifier.

In the embodiment depicted in FIG. 4, defect classifier training module 178 determines a relative measure of importance of each of the one or more attributes provided as input to the trained statistical classifier. FIG. 9 depicts an illustration of a measure of relative importance of a number of attributes provided as input to the statistical classifier. In addition, defect classifier training module 178 determines a subset of the attributes based on the relative measure of importance associated with each of the one or more attributes. For example, the defect classifier training module 178 determines that all attributes having an importance value below a predetermined threshold value are eliminated. In one example, the defect classifier training module 178 determines that all attributes having an importance value below 25 are eliminated. The statistical classifier is subsequently retrained based on the remaining attributes associated with each of the one or more training images as input to the statistical classifier and the known classification associated with each of the one or more training images as output of the statistical classifier. The evaluation, reduction, and retraining of the statistical classifier may be iteratively repeated while classifier performance remains above an acceptable level.

Inspection system 100 includes a processor 131 and an amount of computer readable memory 132. Processor 131 and memory 132 may communicate over bus 133. Memory 132 includes an amount of memory 134 that stores an amount of program code that, when executed by processor 131, causes processor 131 to execute the defect detection and classification functionality described herein.

System 150 includes a processor 161 and an amount of computer readable memory 162. Processor 161 and memory 162 may communicate over bus 163. Memory 162 includes an amount of memory 164 that stores an amount of program code that, when executed by processor 161, causes processor 161 to execute the defect detection and classification functionality described herein.

In some embodiments, the trained defect classifier 179 is communicated to inspection system 100 and applied to the defect images generated by inspection system 100. Detection threshold values associated with each optical mode are adjusted to achieve a desirable nuisance rate. In the embodiment depicted in FIG. 1, inspection system 100 implements trained defect classifier 179 to identify and classify defects based on an analysis of two or three dimensional images of semiconductor structures in a production setting. In some examples, processor 131 is configured to detect and classify defects from images as described herein.

In addition, inspection system 100 may include peripheral devices useful to accept inputs from an operator (e.g., keyboard, mouse, touchscreen, etc.) and display outputs to the operator (e.g., display monitor). Input commands from an operator may be used by computing system 130 to adjust threshold values used to control illumination power. The resulting power levels may be graphically presented to an operator on a display monitor.

Figure 11:
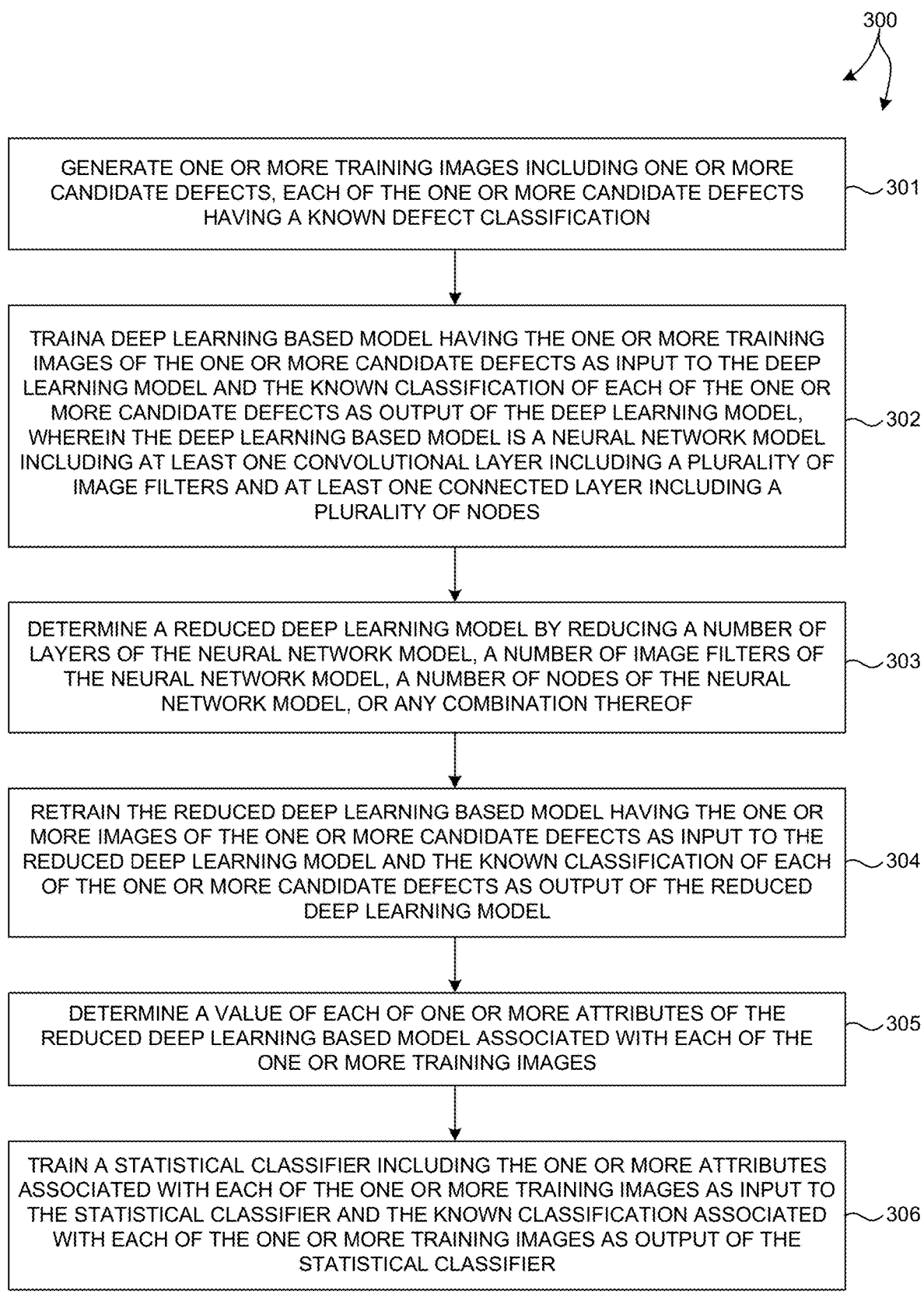
FIG. 11 illustrates a flowchart of an exemplary method 300 useful for classifying defects based on automatically generated attributes of defect images.

FIG. 11 illustrates a flowchart of an exemplary method 300 useful for detecting defects based on images of semiconductor structures. In some non-limiting examples, inspection system 100 described with reference to FIG. 1 is configured to implement method 300. However, in general, the implementation of method 300 is not limited by the specific embodiments described herein.

In block 301, one or more training images including one or more candidate defects are generated, for example, by inspection system 100. Each of the one or more candidate defects has a known defect classification.

In block 302, a deep learning based model having the one or more training images of the one or more candidate defects as input and the known classification of each of the one or more candidate defects as output is trained. In some embodiments, the deep learning based model is a neural network model including at least one convolutional layer including a plurality of image filters and at least one connected layer including a plurality of nodes.

In block 303, a reduced deep learning model is determined by reducing a number of layers of the neural network model, a number of image filters of the neural network model, a number of nodes of the neural network model, or any combination thereof.

In block 304, the reduced deep learning based model having the one or more images of the one or more candidate defects as input to the reduced deep learning model and the known classification of each of the one or more candidate defects as output is retrained.

In block 305, a value of each of one or more attributes of the reduced deep learning based model associated with each of the one or more training images is determined.

In block 306, a statistical classifier including the one or more attributes associated with each of the one or more training images as input and the known classification associated with each of the one or more training images as output is trained.

In general, the classification techniques described herein can be applied during research and development, production ramp, and high volume production phases of manufacture of semiconductor devices, and is applicable to any optical, image-based measurement technique. In addition, these techniques may be applied to optical and x-ray inspection modalities.

Regardless of the particular type of fabrication process, defects need to be detected in all levels of a multiple layer stack and as early as possible in the particular process. Certain inspection embodiments preferably include detection of defects throughout a stack, including the stack surface and throughout the various depths of a stack. For example, certain embodiments allow defects to be found at depths of up to about three micrometers. In another embodiment, defects can be detected at stack depths that are as large as about eight micrometers. The thickness of a vertical ONON or OPOP stack under inspection is limited only by the depth of penetration of the illumination light. Transmission through an oxide-nitride-oxide-nitrite (ONON) or oxide-polysilicon-oxide-polysilicon (OPOP) stack is limited less by absorption at longer wavelengths. Thus, longer illumination wavelengths may be employed to effectively inspect very deep structures.

The inspection systems and classification techniques described herein can be applied to three dimensional images of complex, vertically stacked structures, including, but not limited to 3D negative-AND (NAND) gate memory devices, vertical NAND (VNAND) memory structures, any suitable 3D or vertical semiconductor structures, such as NAND or NOR memory devices formed using terabit cell array transistors (TCAT), vertical-stacked array transistors (VSAT), bit cost scalable technology (BiCST), piped shaped BiCS technology (P-BiCS), etc. The vertical direction is generally a direction that is perpendicular to the substrate surface. Additionally, although particular fabrication steps, processes, and materials are employed to form such 3D structures, inspection embodiments may be applied at any point in the fabrication flow and such layers may include any number and type of materials.

Figure 10:
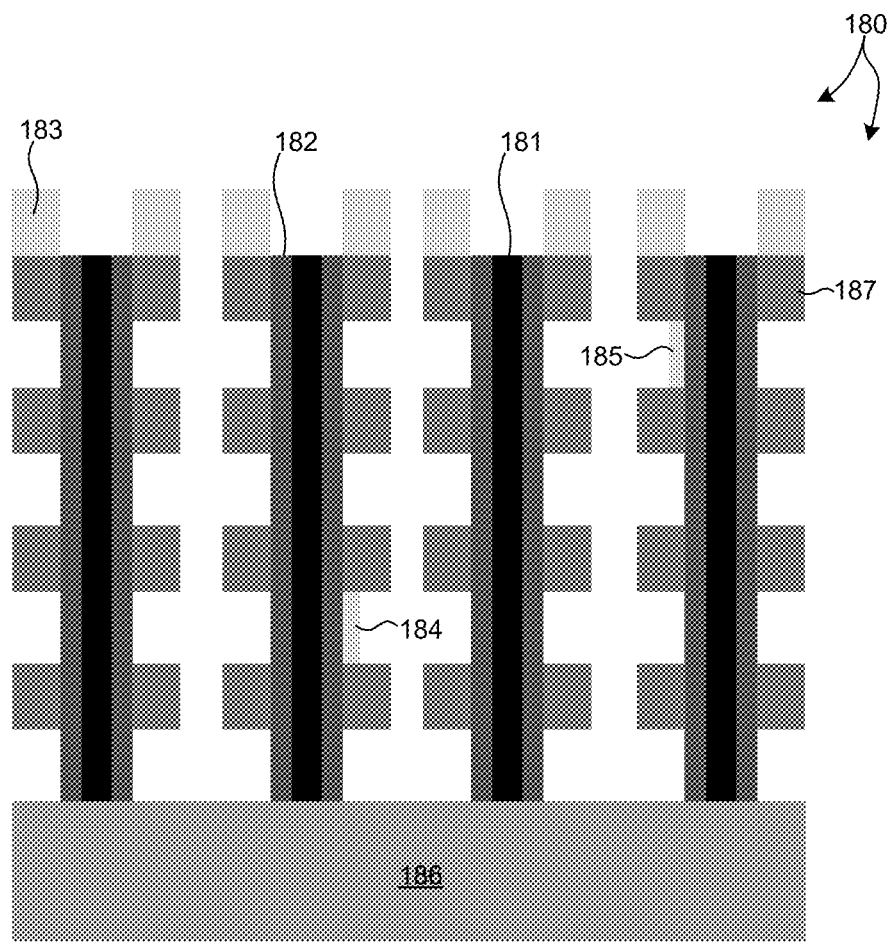
FIG. 10 depicts a simplified illustration of a 3D NAND structure 180 at the silicon nitride removal step of the wafer production process.

FIG. 10 depicts a simplified illustration of a 3D NAND structure 180 at the silicon nitride (e.g., SiN or Si3N4) removal step of the wafer production process for illustrative purposes. A manufactured 3D NAND structure includes additional features and elements. In one example, a manufactured 3D NAND structure includes many additional layers and some of the depicted structures (e.g., structure 182) include additional materials. Polysilicon structures 182 surrounding oxide core structures 181 extend vertically (e.g., normal to the surface of substrate 186) in the multilayer 3D NAND structure. Layers of Silicon oxide 187 are spaced apart from one another by layers of Silicon nitride (not shown) that are subsequently etched away. Silicon nitride layer 183 is not etched away for purposes of illustration in FIG. 10. The next step in the process is to grow tungsten in the space between the silicon oxide layers. However, as illustrated in FIG. 10, incomplete etching has left behind silicon nitride defects 184 and 185. The electronic device will not function with defects 184 and 185. Thus, it is important to measure this defect as early as possible in the fabrication process to prevent loss of time and resources associated with further processing of a device that is destined to fail.

Various embodiments are described herein for an inspection system or tool that may be used for inspecting a specimen. The term "specimen" is used herein to refer to a wafer, a reticle, or any other sample that may be inspected for defects, features, or other information (e.g., an amount of haze or film properties) known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as quartz. A reticle may be disposed above a resist-covered wafer during an exposure step of a lithography process such that the pattern on the reticle may be transferred to the resist.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. In one example, a detector may include a fiber array. In one example, inspection system 100 may include more than one light source (not shown). The light sources may be configured differently or the same. For example, the light sources may be configured to generate light having different characteristics that can be directed to a wafer at the same or different illumination areas at the same or different angles of incidence at the same or different times. The light sources may be configured according to any of the embodiments described herein. In addition one of the light sources may be configured according to any of the embodiments described herein, and another light source may be any other light source known in the art. In some embodiments, an inspection system may illuminate the wafer over more than one illumination area simultaneously. The multiple illumination areas may spatially overlap. The multiple illumination areas may be spatially distinct. In some embodiments, an inspection system may illuminate the wafer over more than one illumination area at different times. The different illumination areas may temporally overlap (i.e., simultaneously illuminated over some period of time). The different illumination areas may be temporally distinct. In general, the number of illumination areas may be arbitrary, and each illumination area may be of equal or different size, orientation, and angle of incidence. In yet another example, inspection system 100 may be a scanning spot system with one or more illumination areas that scan independently from any motion of wafer 103. In some embodiments an illumination area is made to scan in a repeated pattern along a scan line. The scan line may or may not align with the scan motion of wafer 103. Although as presented herein, wafer positioning system 114 generates motion of wafer 103 by coordinated rotational and translational movements, in yet another example, wafer positioning system 114 may generate motion of wafer 103 by coordinating two translational movements. For example, wafer positioning system 114 may generate motion along two orthogonal, linear axes (e.g., X-Y motion).

Accordingly, various modifications, adaptations, and combinations of various features of the described embodiments can be practiced without departing from the scope of the invention as set forth in the claims.

What is claimed is:

1. A method comprising:
generating one or more training images including one or more candidate defects, each of the one or more candidate defects having a known defect classification;
training a deep learning based model having the one or more training images of the one or more candidate defects as input to the deep learning model and the known classification of each of the one or more candidate defects as output of the deep learning model, wherein the deep learning based model is a neural network model including at least one convolutional layer including a plurality of image filters and at least one connected layer including a plurality of nodes;
determining a reduced deep learning model by reducing a number of layers of the neural network model, a number of image filters of the neural network model, a number of nodes of the neural network model, or any combination thereof;
retraining the reduced deep learning based model having the one or more images of the one or more candidate defects as input to the reduced deep learning model and the known classification of each of the one or more candidate defects as output of the reduced deep learning model;
determining a value of each of one or more attributes of the reduced deep learning based model associated with each of the one or more training images; and
training a statistical classifier including the value of each of the one or more attributes of the reduced deep learning based model associated with each of the one or more training images as input to the statistical classifier and the known classification associated with each of the one or more training images as output of the statistical classifier.

2. The method of claim 1, wherein the one or more attributes includes a maximum pixel intensity of a filtered image, wherein the filtered image is any of the one or more training images operated on by any of the plurality of image filters.

3. The method of claim 1, wherein the one or more attributes includes a value of one or more nodes of the neural network model.

4. The method of claim 1, further comprising:
determining a value of each of one or more manually generated attributes associated with each of the one or more candidate defects, wherein the input of the statistical classifier also includes the one or more manually generated attributes.

5. The method of claim 1, further comprising:
training a statistical model relating values of nodes of a layer of the neural network model to values of nodes of a subsequent layer of the neural network model;
determining a relative measure of importance of the layer, a relative measure of importance of each node of the layer, a relative measure of importance of each image filter, or any combination thereof, based on the trained statistical model, wherein the reducing the number of layers of the neural network model, the number of image filters of the neural network model, the number of nodes of the neural network model, or any combination thereof, is based on the determined relative measure of importance of the layer, the relative measure of importance of each node of the layer, the relative measure of importance of each image filter, or any combination thereof.

6. The method of claim 1, wherein the one or more training images includes a first image including a first instance of a structure associated with the one or more candidate defects and a second image including a second instance of the structure.

7. The method of claim 6, wherein the one or more training images includes a difference image, wherein the difference image is a pixel-by-pixel difference between the first and second images.

8. The method of claim 6, wherein the first and second images are collected from the same wafer.

9. The method of claim 1, further comprising:
generating one or more sample images including one or more candidate defects, each of the one or more candidate defects having an unknown defect classification;
determining a value of each of the one or more attributes of the reduced deep learning based model associated with each of the one or more sample images; and
determining a classification of each of the one or more candidate defects based on the trained statistical classifier, wherein an input to the trained statistical classifier includes the values of the one or more attributes associated with each of the one or more sample images and the output of the trained statistical classifier is the classification of each of the one or more candidate defects.

10. The method of claim 1, further comprising:
determining a relative measure of importance of each of the one or more attributes based on the trained statistical classifier;
determining a subset of the one or more attributes based on the relative measure of importance associated with each of the one or more attributes;
retraining the statistical classifier including the subset of the one or more attributes associated with each of the one or more training images as input to the statistical classifier and the known classification associated with each of the one or more training images as output of the statistical classifier.

11. A system comprising:
an illumination source providing a first amount of illumination light to a semiconductor wafer at locations of one or more candidate defects on a semiconductor wafer, each of the one or more candidate defects having a known defect classification;
a detector detecting an amount of light from the semiconductor wafer in response to the first amount of illumination light and generating a plurality of training images including the one or more candidate defects; and
a computing system configured to:
train a deep learning based model having the one or more training images of the one or more candidate defects as input to the deep learning model and the known classification of each of the one or more candidate defects as output of the deep learning model, wherein the deep learning based model is a neural network model including at least one convolutional layer including a plurality of image filters and at least one connected layer including a plurality of nodes;

determine a reduced deep learning model by reducing a number of layers of the neural network model, a number of image filters of the neural network model, a number of nodes of the neural network model, or any combination thereof;
retrain the reduced deep learning based model having the one or more images of the one or more candidate defects as input to the reduced deep learning model and the known classification of each of the one or more candidate defects as output of the reduced deep learning model;
determine a value of each of one or more attributes of the reduced deep learning based model associated with each of the one or more training images; and
train a statistical classifier including the value of each of the one or more attributes of the reduced deep learning based model associated with each of the one or more training images as input to the statistical classifier and the known classification associated with each of the one or more training images as output of the statistical classifier.

12. The system of claim 11, wherein the one or more attributes includes a maximum pixel intensity of a filtered image, wherein the filtered image is any of the one or more training images operated on by any of the plurality of image filters.

13. The system of claim 11, wherein the one or more attributes includes a value of one or more nodes of the neural network model.

14. The system of claim 11, the computing system further configured to:
determine a value of each of one or more manually generated attributes associated with each of the one or more candidate defects, wherein the input of the statistical classifier also includes the one or more manually generated attributes.

15. The system of claim 11, the computing system further configured to:
train a statistical model relating values of nodes of a layer of the neural network model to values of nodes of a subsequent layer of the neural network model; and
determine a relative measure of importance of the layer, a relative measure of importance of each node of the layer, a relative measure of importance of each image filter, or any combination thereof, based on the trained statistical model, wherein the reducing the number of layers of the neural network model, the number of image filters of the neural network model, the number of nodes of the neural network model, or any combination thereof, is based on the determined relative measure of importance of the layer, the relative measure of importance of each node of the layer, the relative measure of importance of each image filter, or any combination thereof.

16. The system of claim 11, the illumination source providing a second amount of illumination light to a semiconductor wafer at locations of one or more candidate defects on a semiconductor wafer having an unknown defect classification, the detector detecting a second amount of light from the semiconductor wafer in response to the incident amount of illumination light and generating a plurality of sample images including the one or more candidate defects having unknown defect classification, the computing system further configured to:
determine a value of each of the one or more attributes of the reduced deep learning based model associated with each of the one or more sample images; and determine a classification of each of the one or more candidate defects based on the trained statistical classifier, wherein an input to the trained statistical classifier includes the values of the one or more attributes associated with each of the one or more sample images and the output of the trained statistical classifier is the classification of each of the one or more candidate defects.

17. A system comprising:

an illumination source providing a first amount of illumination light to a semiconductor wafer at locations of one or more candidate defects on a semiconductor wafer, each of the one or more candidate defects having a known defect classification;

a detector detecting an amount of light from the semiconductor wafer in response to the first amount of illumination light and generating a plurality of training images including the one or more candidate defects; and a computing system comprising:
  one or more processors; and
  a non-transitory, computer-readable medium storing instructions that when executed by the one or more processors, cause the computing system to:
    train a deep learning based model having the one or more training images of the one or more candidate defects as input to the deep learning model and the known classification of each of the one or more candidate defects as output of the deep learning model, wherein the deep learning based model is a neural network model including at least one convolutional layer including a plurality of image filters and at least one connected layer including a plurality of nodes;
    determine a reduced deep learning model by reducing a number of layers of the neural network model, a number of image filters of the neural network model, a number of nodes of the neural network model, or any combination thereof;
    retrain the reduced deep learning based model having the one or more images of the one or more candidate defects as input to the reduced deep learning model and the known classification of each of the one or more candidate defects as output of the reduced deep learning model;
    determine a value of each of one or more attributes of the reduced deep learning based model associated with each of the one or more training images; and
    train a statistical classifier including the value of each of the one or more attributes of the reduced deep learning based model associated with each of the one or more training images as input to the statistical classifier and the known classification associated with each of the one or more training images as output of the statistical classifier.

18. The system of claim 17, wherein the one or more attributes includes a maximum pixel intensity of a filtered image, wherein the filtered image is any of the one or more training images operated on by any of the plurality of image filters.

19. The system of claim 17, the non-transitory, computer-readable medium further storing instructions, that when executed by the one or more processors, cause the computing system to:
  determine a value of each of one or more manually generated attributes associated with each of the one or more candidate defects, wherein the input of the statistical classifier also includes the one or more manually generated attributes.

20. The system of claim 17, the non-transitory, computer-readable medium further storing instructions, that when executed by the one or more processors, cause the computing system to:
  train a statistical model relating values of nodes of a layer of the neural network model to values of nodes of a subsequent layer of the neural network model; and
  determine a relative measure of importance of the layer, a relative measure of importance of each node of the layer, a relative measure of importance of each image filter, or any combination thereof, based on the trained statistical model, wherein the reducing the number of layers of the neural network model, the number of image filters of the neural network model, the number of nodes of the neural network model, or any combination thereof, is based on the determined relative measure of importance of the layer, the relative measure of importance of each node of the layer, the relative measure of importance of each image filter, or any combination thereof.

* * * * *